US012020682B2

(12) United States Patent
Mandel et al.

(10) Patent No.: US 12,020,682 B2
(45) Date of Patent: Jun. 25, 2024

(54) METHOD FOR EXTRACTING SPEECH FROM DEGRADED SIGNALS BY PREDICTING THE INPUTS TO A SPEECH VOCODER

(71) Applicant: Research Foundation of the City University of New York, New York, NY (US)

(72) Inventors: Michael Mandel, Brooklyn, NY (US); Soumi Maiti, Brooklyn, NY (US)

(73) Assignee: Research Foundation of the City University of New York, New York, NY (US)

( * ) Notice: Subject to any disclaimer, the term of this patent is extended or adjusted under 35 U.S.C. 154(b) by 57 days.

(21) Appl. No.: 17/441,063

(22) PCT Filed: Mar. 20, 2020

(86) PCT No.: PCT/US2020/023799

§ 371 (c)(1),
(2) Date: Sep. 20, 2021

(87) PCT Pub. No.: WO2020/191271

PCT Pub. Date: Sep. 24, 2020

(65) Prior Publication Data

US 2022/0358904 A1 Nov. 10, 2022

Related U.S. Application Data

(60) Provisional application No. 62/820,973, filed on Mar. 20, 2019.

(51) Int. Cl.
*G10L 21/02* (2013.01)
*G10L 13/047* (2013.01)
(Continued)

(52) U.S. Cl.
CPC ........ *G10L 13/047* (2013.01); *G10L 21/0264* (2013.01); *G10L 25/18* (2013.01); *G10L 25/30* (2013.01)

(58) Field of Classification Search
CPC ......... G10L 17/00; G10L 15/00; G10L 25/30; G10L 21/00; G10L 21/02
See application file for complete search history.

(56) References Cited

U.S. PATENT DOCUMENTS 8,527,276 B1 * 9/2013 Senior .................... G06N 3/084
704/258
9,536,540 B2 1/2017 Avendano et al.
(Continued)

FOREIGN PATENT DOCUMENTS

CN 109326302 B * 11/2022 ............. G10L 17/00
EP 2363853 A1 * 9/2011 ......... G10L 21/0208
KR 102096588 B1 * 4/2020

OTHER PUBLICATIONS

Jean-Marc, "LPCNET: Improving Neural Speech Synthesis through Linear Prediction," ICASSP 2019—2019 IEEE International Conference on Acoustics, Speech and Signal Processing (ICASSP), Brighton, UK, 2019, pp. 5891-5895, doi: 10.1109/ICASSP.2019.8682804. (Year: 2019).*
(Continued)

*Primary Examiner* — Shreyans A Patel
(74) *Attorney, Agent, or Firm* — Peter J. Mikesell; Schmeiser, Olsen & Watts, LLP

(57) ABSTRACT

A method for Parametric resynthesis (PR) producing an audible signal. A degraded audio signal is received which includes a distorted target audio signal. A prediction model predicts parameters of the audible signal from the degraded signal. The prediction model was trained to minimize a loss function between the target audio signal and the predicted
(Continued)

audible signal. The predicted parameters are provided to a waveform generator which synthesizes the audible signal.

15 Claims, 6 Drawing Sheets

(51) Int. Cl.

| | |
|---|---|
| ***G10L 21/0264*** | (2013.01) |
| ***G10L 25/18*** | (2013.01) |
| ***G10L 25/30*** | (2013.01) |

(56) References Cited

U.S. PATENT DOCUMENTS

| | | | | |
|---|---|---|---|---|
| 2018/0122401 | A1 | 5/2018 | Iyer et al. | |
| 2018/0336880 | A1* | 11/2018 | Arik | G10L 15/063 |
| 2018/0366138 | A1 | 12/2018 | Ramprashad | |
| 2019/0005976 | A1* | 1/2019 | Peleg | G10L 25/30 |
| 2019/0043491 | A1* | 2/2019 | Kupryjanow | G10L 21/0208 |

OTHER PUBLICATIONS

Ryan et al. "Waveglow: A flow-based generative network for speech synthesis." In ICASSP 2019—2019 IEEE International Conference on Acoustics, Speech and Signal Processing (ICASSP), pp. 3617-3621. IEEE, 2019. (Year: 2019).*

Masanori et al. "WORLD: a vocoder-based high-quality speech synthesis system for real-time applications." IEICE Transactions on Information and Systems 99, No. 7 (2016): 1877-1884. (Year: 2016).*

Wu, Z. et al.; Merlin: An Open Source Neural Network Speech Synthesis System; 9th ISCA Speech Synthesis Workshop; Sep. 13-15, 2016; pp. 202-207; doi: 10.21437/SSW.2016-33.

Morise, M. et al.; WORLD: A Vocoder-Based High-Quality Speech Synthesis System for Real-Time Applications; IEICE Trans. Inf. & Syst.; Jul. 7, 2016; pp. 1877-1884; vol. E99-D.

Maiti, S. et al.; Parametric Resynthesis With Neural Vocoders; 2019 IEEE Workshop on Applications of Signal Processing to Audio and Acoustics; Oct. 20-23, 2019; 5 pages.

Maiti, S. et al.; Speaker Independence of Neural Vocoders and Their Effect on Parametric Resynthesis Speech Enhancement; ICASSP 2020—2020 IEEE International Conference on Acoustics, Speech and Signal Processing (ICASSP); May 4-8, 2020; DOI: 10.1109/ICASSP40776.2020.9053296.

Maiti, S. et al.; Speech Denoising By Parametric Resynthesis; ICASSP 2019—2019 IEEE International Conference on Acoustics, Speech and Signal Processing (ICASSP); May 12-17, 2019; 5 pages; DOI: 10.1109/ICASSP.2019.8683130.

Valin, J. LPCNET: Improving Neural Speech Synthesis Through Linear Prediction; ICASSP 2019—2019 IEEE International Conference on Acoustics, Speech and Signal Processing (ICASSP); May 12-17, 2019; 5 pages; DOI: 10.1109/ICASSP.2019.8682804.

Prenger, R. et al.; WaveGlow: a Flow-Based Generative Network for Speech Synthesis; ICASSP 2019—2019 IEEE International Conference on Acoustics, Speech and Signal Processing (ICASSP); May 12-17, 2019; 5 Pages; DOI: 10.1109/ICASSP.2019.8683143.

ISA/U.S.; International Search Report/Written Opinion dated Jun. 19, 2020 in corresponding International Application PCT/US2020/023799.

Van Den Oord, A. et al.; WaveNet: A Generative Model for Raw Audio; arXiv; Sep. 12, 2016 15 pages; https://doi.org/10.48550/arXiv.1609.03499.

Liu, B. et al.; Speech Enhancement Based on Analysis-Synthesis Framework with Improved Parameter Domain Enhancement; J Sign Process Syst; Jul. 24, 2015; pp. 141-150; vol. 82.

Chen, R. et al.; Noise Suppression Based On an Analysis-Synthesis Approach; 18th European Signal Processing Conference (EUSIPCO—2010); Aalborg, Denmark, Aug. 23-27, 2010; pp. 1539-1543.

EPO; Extended European Search Report dated Nov. 28, 2022 in corresponding European Application 20773184.5.

* cited by examiner

METHOD FOR EXTRACTING SPEECH FROM DEGRADED SIGNALS BY PREDICTING THE INPUTS TO A SPEECH VOCODER

CROSS-REFERENCE TO RELATED APPLICATIONS

This application claims priority to and is non-provisional of U.S. Patent Application 62/820,973 (filed Mar. 20, 2019), the entirety of which is incorporated herein by reference.

STATEMENT OF FEDERALLY SPONSORED RESEARCH OR DEVELOPMENT

This invention was made with Government support under grant number U.S. Pat. No. 1,618,061 awarded by the National Science Foundation. The government has certain rights in the invention.

BACKGROUND OF THE INVENTION

While the problem of removing noise from speech has been studied for many years, it has focused on modifying the noisy speech to make it less noisy. Imperfections in this process lead to speech that is accidentally removed and noise that is accidentally not removed, both undesirable outcomes. Even if these modifications worked perfectly, in order to remove the noise, some speech would have to be removed as well. For example, speech that perfectly overlaps with the noise (in time and frequency) is often removed.

Speech synthesis systems, on the other hand, can produce high-quality speech from textual inputs. For example, statistical text to speech (TTS) systems map text to acoustic parameters of the speech signal and use a vocoder to then generate speech from these acoustic features. Statistical TTS systems train an acoustic model to learn the mapping from text to acoustic parameters of speech recordings. This is the most difficult part of this task, because it must predict from text the timing, pitch contour, intensity contour, and pronunciation of the speech, elements of the so-called prosody of the speech. To date, no single solution has been found entirely satisfactory. An improved method is therefore desired.

The discussion above is merely provided for general background information and is not intended to be used as an aid in determining the scope of the claimed subject matter.

SUMMARY

A method for Parametric resynthesis (PR) producing an audible signal. A degraded audio signal is received which includes a distorted target audio signal. A prediction model predicts parameters of the audible signal from the degraded signal to produce a predicted signal. The prediction model was trained to minimize a loss function between the target audio signal and the corresponding predicted audible signal. The predicted parameters are provided to a waveform generator which synthesizes the audible signal. This method combines the high quality speech generation of speech synthesis with the realistic prosody of speech enhancement. It therefore produces higher quality speech than traditional enhancement methods because it utilizes synthesis instead of modification. It produces higher quality prosody than text-to-speech because it estimates the true prosody from the noisy speech as opposed to having to predict it from the text.

In a first embodiment, a method for Parametric resynthesis (PR) producing a predicted audible signal from a degraded audio signal produced by distorting the target audio signal is provided. The method comprising: receiving the degraded audio signal which is derived from the target audio signal; predicting, with a prediction model, a plurality of parameters of the predicted audible signal from the degraded audio signal; providing the plurality of parameters to a waveform generator; synthesizing the predicted audible signal with the waveform generator; wherein the prediction model has been trained to reduce a loss function between the target audio signal and the predicted audible signal.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

This disclosure provides a system that predicts the acoustic parameters of clean speech from a noisy observation and then uses a vocoder to synthesize the speech. This disclosure shows that this system can produce vocoder-synthesized high-quality and noise-free speech utilizing the prosody (timing, pitch contours, and pronunciation) observed in the real noisy speech.

Without wishing to be bound to any particular theory, the noisy speech signal is believed to have more information about the clean speech than pure text. Specifically, it is easier to model different speaker voice qualities and prosody from the noisy speech than from text. Hence, one can build a prediction model that takes noisy audio as input and accurately predicts acoustic parameters of clean speech, as in TTS. From the predicted acoustic features, clean speech is generated using a speech synthesis vocoder. A neural network was trained to learn the mapping from noisy speech features to clean speech acoustic parameters. Because a clean resynthesis of the noisy signal is being created, the output speech quality will be higher than standard speech denoising systems and substantially noise-free. Hereafter the disclosed model is referred to as parametric resynthesis.

This disclosure shows parametric resynthesis outperforms statistical text to speech (TTS) in terms of traditional speech synthesis objective metrics. The intelligibility and quality of the resynthesized speech is evaluated and compare to a mask predicted by a DNN-based system and the oracle Wiener mask. The resynthesized speech is noise-free and has higher overall quality and intelligibility than both the oracle Wiener mask and the DNN-predicted mask. A single parametric resynthesis model can be used for multiple speakers. The disclosed system utilizes a parametric speech synthesis model, which more easily generalizes to combinations of conditions not seen explicitly in training examples.

The disclosed denoising system is relatively simple, as it does not require an explicit model of the observed noise in order to converge.

Figure 1:
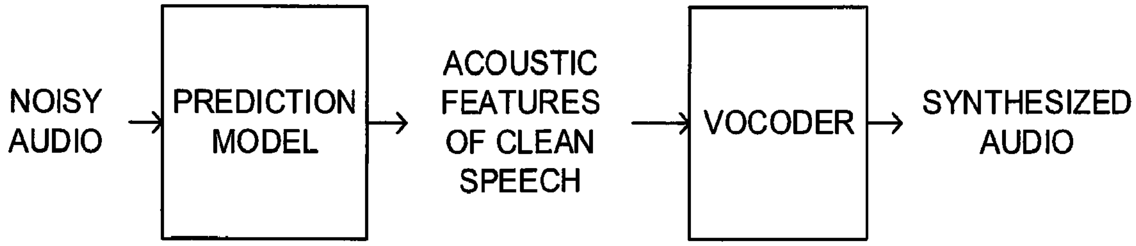
FIG. 1 is a flow diagram of a vocoder denoising model.

Parametric resynthesis consists of two stages: prediction and synthesis as shown in FIG. 1. In the first stage, a prediction model is trained with noisy audio features as input and clean acoustic features as output labels. This part of the PR model removes noise from a noisy observation. In the second stage, a vocoder is used to resynthesize audio from the predicted acoustic features.

Synthesis from acoustic features: In one embodiment, for the synthesis from acoustic features, the WORLD vocoder is used. This vocoder allows both the encoding of speech audio into acoustic parameters and the decoding of acoustic parameters back into audio with very little loss of speech quality. The advantage is that these parameters are much easier to predict using neural network prediction models than complex spectrograms or raw time-domain waveforms. The encoding of clean speech was used to generate training targets and the decoding of predictions to generate output audio. The WORLD vocoder is incorporated into the Merlin neural network-based speech synthesis system, and Merlin's training targets and losses were used for the initial model.

Prediction model: The prediction model is a neural network that takes as input log mel spectra of the noisy audio and predicts clean speech acoustic features at a fixed frame rate. In one embodiment, clean speech acoustic parameters are extracted from the encoder of the WORLD vocoder. The encoder outputs three acoustic parameters: i) spectral envelope, ii) log fundamental frequency (F0) and iii) aperiodic energy of the spectral envelope. Fundamental frequency is used to predict voicing, a parameter required for the vocoder. All three features are concatenated with their first and second derivatives and used as the targets of the prediction model. There are 60 features from spectral envelope, 5 from band aperiodicity, 1 from F0 and a Boolean flag for the voiced or unvoiced decision. The prediction model is then trained to minimize the mean squared error loss between prediction and ground truth. This architecture is similar to the acoustic modeling of statistical TTS. In one embodiment, a feed forward DNN was first used as the core of the prediction model. An LSTM was subsequently used for better sequence-to-sequence mapping. Input features are concatenated with neighboring frames (±4) for the feed-forward DNN.

EXPERIMENTS

Dataset: In one embodiment, the noisy audio (i.e. a degraded audio signal) is produced by (1) filtering the target audio signal, adding noise to the filtered signal and then non-linearly processing a sum of the filtered signal and the summed signal. In another embodiment, examined here, the filter is the identity filter and no non-linear processing is applied, so the noisy dataset is generated by only adding environmental noise to the CMU arctic speech dataset. The arctic dataset contains four versions of the same sentences spoken by four different speakers, with each version having 1132 sentences. The speech is recorded in studio environment. The sentences are taken from different parts of project Gutenberg and are phonetically balanced. To make the data noisy, environmental noise was added from the CHiME-3 challenge. The noise was recorded in four different environments: street, pedestrian walkway, cafe, and bus interior. Six channels are available for each noisy file and all channels were treated as a separate noise source. Clean speech was mixed with one of the random noise files starting from a random offset with a constant gain of 0.95. The signal-to-noise ratio (SNR) of the noisy files ranges from −6 dB to 21 dB, with average being 6 dB. The sentences are 2 to 13 words long, with a mean length of nine words. A female speech corpus ("slt") was mostly used for the experiments. A male ("bdl") voice is used to test the speaker dependence of the system. The dataset is partitioned into 1000-66-66 as train-dev-test. The input and output features are extracted with a window size of 64 ms at a 5 ms hop size.

Evaluation: Two aspects of the parametric resynthesis system will now be evaluated. First, speech synthesis objective metrics like spectral distortion and F0 prediction errors are compared with a TTS system. This measures the performance of the model as compared to TTS. Second, the intelligibility and quality of the speech generated by parametric resynthesis (PR) is compared against two speech enhancement systems, ideal-ratio mask and oracle Wiener mask (OWM). The ideal ratio mask is predicted by a DNN (DNN-IRM) and trained with the same data as PR. The OWM uses knowledge of the true speech to estimate the Wiener mask. Hence, the OWM places an upper bound on the performance achievable by mask-based enhancement systems.

In some embodiments of the disclosed method, the vocoded speech can sound mechanical or muffled at times. To address this, clean speech was encoded and decoded with the vocoder and the loss in intelligibility and quality attributable to the vocoder alone was found to be minimal. This system was referred to as vocoder-encoded-decoded (VED). Moreover, the performance of a DNN that predicts vocoder parameters from clean speech was measured as a more realistic upper bound on the speech denoising system. This is the PRmodel with clean speech as input, referred to as PR-clean.

TTS objective measures: First, TTS objective measures of PR and PR-clean were compared with the TTS system. A feedforward DNN system was trained with layers of 512 width with tanh activation function and an LSTM system with 2 layers of width 512. An optimization and early stopping regularization were used. For TTS system inputs, ground truth transcriptions of the noisy speech was used. As both TTS and PR are predicting acoustic features, errors in the prediction were measured. Mel cepstral distortion (MCD) and band aperiodicity distortion (BAPD), F0 root mean square error (RMSE), Pearson correlation (CORR) of F0 and classification error in voiced-unvoiced decisions (VUV) were measured with ground truth acoustic features. The results are reported in Table 1.

TABLE 1

TTS objective measures. For MCD, BAPD, RMSE and VUV lower is better, for CORR higher is better.

| | Spectral Distortion | | F0 measures | | |
|---|---|---|---|---|---|
| System | MCD (dB) | BAPD (db) | RMSE (Hz) | CORR | VUV |
| PR-clean | 2.68 | 0.16 | 4.95 | 0.96 | 2.78% |
| TTS (DNN) | 5.28 | 0.25 | 13.06 | 0.71 | 6.66% |
| TTS (LSTM) | 5.05 | 0.24 | 12.60 | 0.73 | 5.60% |
| PR (DNN) | 5.07 | 0.19 | 8.83 | 0.93 | 6.48% |
| PR (LSTM) | 4.81 | 0.19 | 5.62 | 0.95 | 5.27% |

Results from PR-clean show that speech with very low spectral distortion and F0 error can be achieved from clean speech. More importantly, Table 1 shows that PR performs considerably better than TTS systems. F0 measures, RMSE and Pearson correlation are significantly better in the parametric resynthesis system than TTS. This demonstrates that it is easier to predict acoustic features from noisy speech than from text. In this data, the LSTM performs best and is used for the following experiments.

Evaluating multiple speaker model: A PR model was trained with speech from two speakers and its effectiveness on both speaker datasets was tested. Two single-speaker PR models were trained using the slt (female) and bdl (male) data in the CMU arctic dataset. A new PR model was then trained with speech from both speakers. The objective metrics on both datasets were measured to understand how well a single model can be generalized for both speakers.

These objective metrics are reported in Table 2. The single-speaker model was observed to slightly outperform the multi-speaker model. On the bdl dataset, however, the multi-speaker model performs better than the singlespeaker model in predicting voicing decision and MCD; and scores the same in BAPD and F0 correlation, but does worse on F0 RMSE. These results show that the same model can be used for multiple speakers.

TABLE 2

TTS objective measures for multiple-speaker parametric resynthesis models compared to single speaker model on two 32-utterance single-speaker test sets.

| | Speakers | | Spectral Distortion | | F0 measures | | |
|---|---|---|---|---|---|---|---|
| Model | Train | Test | MCD | BAPD | RMSE | CORR | UUV |
| PR | slt | slt | 4.81 | 0.19 | 5.62 | 0.95 | 5.27% |
| PR | slt + bdl | slt | 4.91 | 0.20 | 8.36 | 0.92 | 6.50% |
| PR | bdl | bdl | 5.40 | 0.21 | 9.67 | 0.82 | 12.34% |
| PR | slt + bdl | bdl | 5.19 | 0.21 | 10.41 | 0.82 | 12.17% |

Speech enhancement objective measures: Objective intelligibility was measured with short-time objective intelligibility (STOI) and objective quality with perceptual evaluation of speech quality (PESQ). STOI and PESQ of clean, noisy, VED, TTS, PR-clean were also measured for reference. The results are reported in Table 3.

TABLE 3

Speech enhancement objective metrics: Intelligibility and Quality, higher is better

| Model | PESQ | STOI |
|---|---|---|
| Clean | 4.50 | 1.00 |
| VED | 3.39 | 0.93 |
| PR-clean | 2.98 | 0.92 |
| OWM | 2.27 | 0.92 |
| Noisy | 1.88 | 0.88 |
| TTS | 1.33 | 0.08 |
| PR | 2.43 | 0.87 |
| DNN-IRM | 2.26 | 0.80 |

VED files are very high in objective quality and intelligibility. This shows that the vocoder loss is negligible compared to the clean signal and much higher than the speech enhancement systems. The PR-clean system scores slightly lower in intelligibility and quality than VED. The TTS system scores very low, but this can be explained by the fact that the objective measures compare the output to the original clean signal.

For speech denoising systems, parametric resynthesis outperforms both the OWM and the predicted IRM in objective quality scores. While the oracle Wiener mask is an upper bound on mask-based speech enhancement, it does degrade the quality of the speech by attenuating and damaging speech regions where there is speech present, but the noise is louder. Parametric resynthesis also achieves higher intelligibility than the predicted IRM system but slightly lower intelligibility than the oracle Wiener mask.

Subjective Intelligibility and Quality: The subjective intelligibility and quality of PR was evaluated and compared with OWM, DNN-IRM, PR-clean, and the ground truth clean and noisy speech. From 66 test sentences, 12 were chosen, with 4 sentences from each of three groups: SNR<0 dB, 0 dB SNR≤5 dB, and 5 dB≤SNR. In preliminary listening tests, PR-clean files sounds were as good as VED, so only PR-clean was included. This resulted in a total of 84 files (12 sentences times 7 versions).

Figure 2:
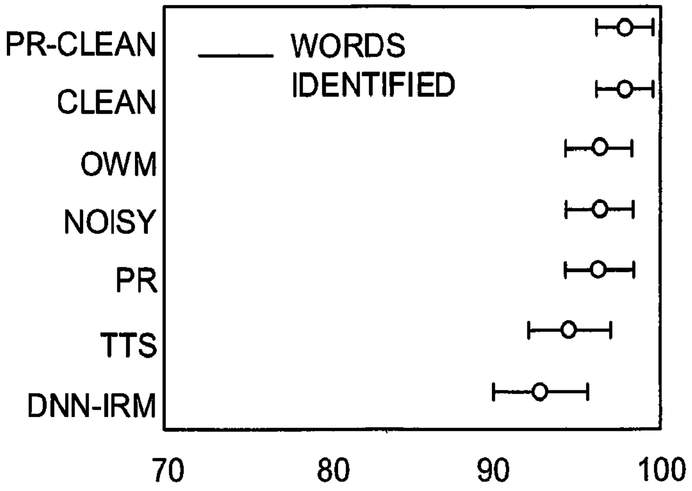
FIG. 2 is a graph showing subjective intelligibility by percentage of correctly identified words.

For the subjective intelligibility test, subjects were presented with all 84 sentences in a random order and were asked to transcribe the words that they heard in each one. Three subjects listened to the files. A list of all of the words was given to the subjects in alphabetical order, but they were asked to write what they hear. The percentage of words correctly identified were averaged over all files and show in FIG. 2. Intelligibility is very high (>90%) in all systems, including noisy. PR-clean achieves intelligibility as good as clean speech. OWM, PR, and noisy speech intelligibility were the same as each other and very close to clean speech. This shows that PR achieves intelligibility as high as the oracle Wiener mask.

Figure 3:
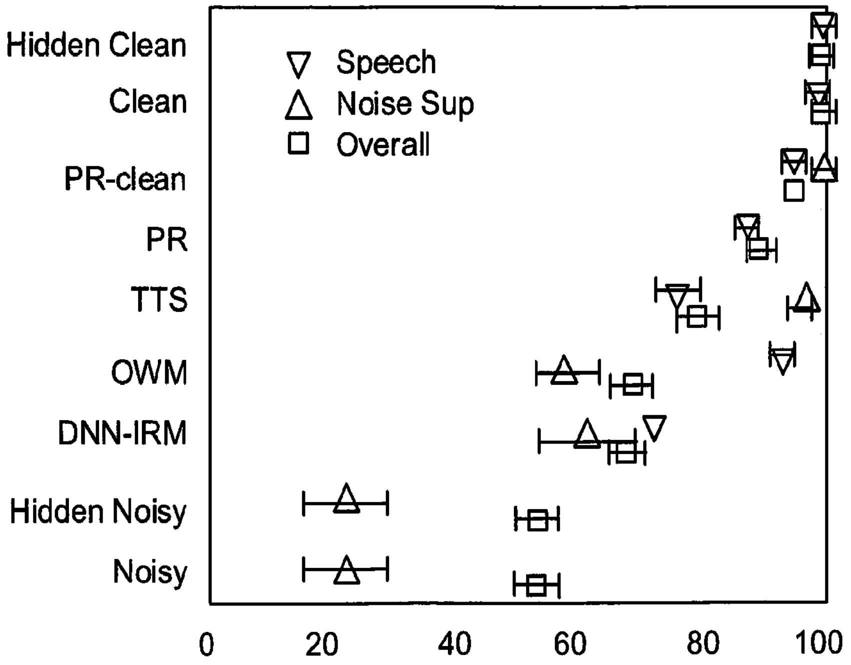
FIG. 3 a graph showing subjective quality assessment with higher scores showing better quality.

The subjective speech quality test follows the Multiple Stimuli with Hidden Reference and Anchor (MUSHRA) paradigm. Subjects were presented with all seven of the versions of a given sentence together in a random order without identifiers, along with reference clean and noisy versions. The subjects rated the speech quality, noise reduction quality, and over all quality of each version in a range of 1 to 100, with higher scores denoting better quality. Three subjects participated and results are shown in FIG. 3. The PR system achieves perfect noise suppression quality, proving the system is noise-free. PR also achieves better overall quality than IRM and OWM. Among the speech enhancement systems oracle Wiener mask achieves best speech quality, followed by PR. Thus, PR system achieves better quality in all three measures than DNN-IRM, and better noise suppression and overall quality than oracle Wiener mask. A small loss in noise suppression and overall quality was observed for PRclean.

The disclosed parametric resynthesis (PR) system predicts acoustic parameters of clean speech from noisy speech directly, and then uses a vocoder to synthesize "cleaner" speech. This disclosure demonstrates that this model outperforms statistical TTS by utilizing prosody from the noisy speech. It outperforms the oracle Wiener mask in quality by reproducing the entire speech signal, while providing comparable intelligibility.

In another embodiment a neural vocoder, such as WaveNet, is used. Other neural vocoders like WaveRNN, Parallel WaveNet, and WaveGlow have been proposed to improve the synthesis speed of WaveNet while maintaining its high quality. WaveNet and WaveGlow are used as examples in the following descriptions, as these are the two most different architectures. As used in this specification, WaveNet refers to the vocoder described in "WaveNet: A generative Model for Raw Audio" by Oord et al. arXiv:1609.03499, Sep. 12, 2016. WaveGlow refers to the vocoder described in "WaveGlow: A flow-based Generative Network for Speech Synthesis" by Prenger et al. arXiv:1811.00002, Oct. 31, 2018. LPCNet refers to the vocoder described in "LPCNet: Improving Neural Speech Synthesis Through Linear Prediction" by Valin et al. arXiv:1810.11846, Oct. 28, 2018. WaveNet and WaveGlow use a loss function that is the negative conditional log-likelihood of the clean speech under a probabilistic vocoder given the plurality of parameters. LPCNet uses a loss function that is the categorical cross-entropy loss of the predicted probability of an excitation of a linear prediction model.

This disclosure shows PR systems build with two neural vocoders (PR-neural). Comparing PR-neural to other systems, neural vocoders produce both better speech quality and better noise reduction quality in subjective listening tests than PR-World. The PR-neural systems perform better than arecently proposed speech enhancement system, Chimera++, in all quality and intelligibility scores. PR-neural can achieve higher subjective intelligibility and quality ratings than the oracle Wiener mask.

A modified WaveNet model, previously has been used as an end-to-end speech enhancement system. This method works in the time domain and models both the speech and the noise present in an observation. Similarly, the SEGAN and Wave-U-Net models (S. Pascual, A. Bonafonte, and J. Serra, "Segan: Speech enhancement generative adversarial network," arXiv preprint arXiv:1703.09452, 2017 and C. Macartney and T. Weyde, "Improved speech enhancement with the wave-u-net," arXiv preprint arXiv:1811.11307, 2018) are end-to-end source separation models that work in the time domain. Both SEGAN and Wave-U-Net down-sample the audio signal progressively in multiple layers and then up-sample them to generate speech. SEGAN which follows a generative adversarial approach has a slightly lower PESQ than Wave-U-Net. Compared to the WaveNet for speech denoising (P. Rethage, J. Pons, and X. Serra, "A wavenet for speech denoising," in Proc. ICASSP, 2018, pp. 5069-5073) and Wave-U-Net, the disclosed system is simpler and noise-independent because it does not model the noise at all, only the clean speech.

Prediction Model: The prediction model uses the noisy mel-spectrogram, $Y(\omega, t)$ as input and the clean mel-spectrogram, $X(\omega, t)$ from parallel clean speech as the target acoustic parameters that will be fed into the neural vocoder. Thus, in one embodiment, the parameters include a log mel spectrogram which includes a log mel spectrum of individual frames of audio. An LSTM with multiple layers is used as the core architecture. The model is trained to minimize the mean squared error between the predicted mel-spectrogram, $\hat{X}(\omega,t)$ and the clean mel-spectrogram.

$$L=\Sigma_{\omega,t}\|X(\omega,t)-\hat{X}(\omega,t)\|^2 \tag{1}$$

The Adam optimizer is used as the optimization algorithm for training. At test time, given a noisy mel-spectrogram, a clean mel-spectrogram is predicted.

Neural Vocoders: Conditioned on the predicted mel-spectrogram, a neural vocoder is used to synthesize de-noised speech. Two neural vocoders were compared: WaveNet and WaveGlow. The neural vocoders are trained to generate clean speech from corresponding clean mel-spectrograms.

WaveNet: WaveNet is a speech waveform generation model, built with dilated causal convolutional layers. The model is autoregressive, i.e. generation of one speech sample at time step $t(x_t)$ is conditioned on all previous time step samples $(x_1, x_2 \ldots x_{t-1})$. The dilation of the convolutional layers increases by a factor of 2 between subsequent layers and then repeats starting from 1. Gated activations with residual and skip connections are used in WaveNet. It is trained to maximize the likelihood of the clean speech samples. The normalized log mel-spectrogram is used in local conditioning.

The output of WaveNet is modeled as a mixture of logistic components, for high quality synthesis. The output is modeled as a K-component logistic mixture. The model predicts a set of values $\theta=\{\pi_i,\mu_i,s_i\}_{i=1}^{K}$, where each component of the distribution has its own parameters $\mu_i$, $s_i$ and the components are mixed with probability $\pi_i$. The likelihood of sample $x_t$ is then $$P(x_t \mid \theta, X) = \sum_{i=1}^{K} \pi_i \left[\sigma\left(\frac{x_{ti}+0.5}{s_i}\right) - \sigma\left(\frac{x_{ti}+0.5}{s_i}\right)\right] \tag{2}$$

where $x_{ti}=x_t-u_i$ and $P(x_t|\theta,X)$ is the probability density function of clean speech conditioned on mel-spectragram X.

A publicly available implementation of WaveNet was used with a setup similar to tacotron2 (J. Shen, R. Pang, R. J. Weiss, M. Schuster, N. Jaitly, Z. Yang, Z. Chen, Y. Zhang, Y. Wang, R. Skerry-Ryan, et al., "Natural TTS synthesis by conditioning wavenet on mel spectrogram predictions," arXiv preprint arXiv:1712.05884, 2017): 24 layers grouped into 4 dilation cycles, 512 residual channels, 512 gate channels, 256 skip channels, and output as mixture-oflogistics with 10 components. As it is an autoregressive model, the synthesis speed is very slow. The PR system with WaveNet as its vocoder is referred to as PR-WaveNet.

A second publicly available implementation of WaveNet is available from Nvidia, which is the Deep-Voice model of WaveNet and performs faster synthesis. Speech samples are mu-law gauantized to 8 bits. The normalized log mel-spectrogram is used in local conditioning. WaveNet is trained on the cross-entropy between the quantized sample $x_t^{\mu}$ and the predicted quantized sample $\hat{x}_t^{\mu}$.

WaveGlow is based on the Glow concept and has faster synthesis than WaveNet. WaveGlow learns an invertible transformation between blocks of eight time domain audio samples and a standard normal distribution conditioned on the log mel spectrogram. It then generates audio by sampling from this Gaussian density.

The invertible transformation is a composition of a sequence of individual invertible transformations (f), normalizing flows. Each flow in WaveGlow consist of a 1×1 convolutional layer followed by an affine coupling layer. The affine coupling layer is a neural transformation that predicts a scale and bias conditioned on the input speech x and mel-spectrogram X. Let $W_k$ be the learned weight matrix for $k^{th}$ 1×1 the convolutional layer and $s_j(x,X)$ be the predicted scale value at the $j^{th}$ affine coupling layer.

For inference, WaveGlow samples z from a uniform Gaussian distribution and applies the inverse transformations ($f^{-1}$) conditioned on the mel-spectrogram (X) to get back the speech sample x. Because parallel sampling from Gaussian distribution is trivial, all audio samples are generated in parallel. The model is trained to minimize the log likelihood of the clean speech samples x, $$\ln P(x|X)=\ln P(z)-\Sigma_{j=0}^{J}\ln s_j(x,X)-\Sigma_{k=0}^{K}\ln|W_k| \qquad (3)$$

where J is the number of coupling transformations, K is the number of convolutions, lnP(z) is the log-likelihood of the spherical Gaussian with variance $v^2$ and v=1 is used. Note that WaveGlow refers to this parameter as σ, but this disclosures uses v to avoid confusion with the logistic function in (2). The official published waveGlow implementation was used with original setup (12 coupling layers, each consisting of 8 layers of dilated convolution with 512 residual and 256 skip connections). The PR system with WaveGlow as its vocoder is referred to as PR-WaveGlow.

Joint Training: Because the neural vocoders are originally trained on clean mel spectrograms X(ω, t) and are tested on predicted mel-spectrogram $\hat{X}$(ω, t), one can also train both parts of the PR-neural system jointly. The aim of joint training is to compensate for the disparity between the mel spectrograms predicted by the prediction model and consumed by the neural vocoder. Both parts of the PR-neural systems are pretrained then trained jointly to maximize the combined loss of vocoder likelihood and negative mel-spectrogram squared loss. These models are referred as PR-(neural vocoder)-Joint. The following experiments were performed both with and without fine-tuning these models.

Experiments: For the disclosed experiments, the LJSpeech dataset was used to which was added environmental noise from CHiME-3. The LJSpeech dataset contains 13100 audio clips from a single speaker with varying length from 1 to 10 seconds at sampling rate of 22 kHz. The clean speech is recorded with the microphone in a MacBook Pro in a quiet home environment. CHiME-3 contains four types of environmental noises: street, bus, pedestrian, and cafe. The CHiME-3 noises were recorded at 16 kHz sampling rate. To mix them with LJSpeech, white Gaussian noise was synthesized in the 8-11 kHz band matched in energy to the 7-8 kHz band of the original recordings. The SNR of the generated noisy speech varies from −9 dB to 9 dB SNR with an average of 1 dB. 13000 noisy files were used for training, almost 24 hours of data. The test set consist of 24 files, 6 from each noise type. The SNR of the test set varies from −7 dB to 6 dB. The mel-spectrograms are created with window size 46.4 ms, hop size 11.6 ms and with 80 mel bins. The prediction model has 3-bidirectional LSTM layers with 400 units each and was trained with initial learning rate 0.001 for 500 epochs with batch size 64.

Both WaveGlow and WaveNet have published pre-trained models on the LJSpeech data. These pre-trained models were used due to limitations in GPU resources (training the WaveGlow model from scratch takes 2 months on a GPU GeForce GTX 1080 Ti). The published WaveGlow pre-trained model was trained for 580 k iterations (batch size 12) with weight normalization. The pre-trained WaveNet model was trained for~1000 k iterations (batch size 2). The model also uses L2-regularization with a weight of 10-6. The average weights of the model parameters are saved as an exponential moving average with a decay of 0.9999 and used for inference, as this is found to provide better quality. PR-WaveNet-Joint is initialized with the pre-trained prediction model and WaveNet. Then it is trained end-to-end for 355 k iterations with batch size 1. Each training iteration takes ~2.31 s on a GeForce GTX 1080 GPU. PR-WaveGlow-Joint is also initialized with the pre-trained prediction and WaveGlow models. It was then trained for 150 k iterations with a batch size of 3. On a GeForce GTX 1080 Ti GPU, each iteration takes >3 s. WaveNet synthesizes audio samples sequentially, the synthesis rate is ~95-98 samples per second or 0.004×realtime. Synthesizing 1 s of audio at 22 kHz takes ~232 s. Because WaveG-low synthesis can be done in parallel, it takes ~1 s to synthesize 1 s of audio at a 22 kHz sampling rate.

These two PR-neural models were compared with PR-World where the WORLD vocoder is used and the intermediate acoustic parameters are the fundamental frequency, spectral envelope, and band aperiodicity used by WORLD. Note that WORLD does not support 22 kHz sampling rates, so this system generates output at 16 kHz. All PR models were compared with two speech enhancement systems. First is the oracle Wiener mask (OWM), which has access to the original clean speech. The second is called Chimera++[12], which uses a combination of the deep clustering loss and mask inference loss to estimate masks. A local implementation of Chimera++ was used, which was verified to be able to achieve the reported performance on the same dataset as the published model. It was trained with the same data as the PR systems. In addition to the OWM, the best case resynthesis quality was measured by evaluating the neural vocoders conditioned on the true clean mel spectrograms.

Following D. Rethage, J. Pons, and X. Serra, "A wavenet for speech denoising," in Proc. ICASSP, 2018, pp. 5069-5073, S. Pascual, A. Bonafonte, and J. Serra, "Segan: Speech enhancement generative adversarial network," arXiv preprint arXiv:1703.09452, 2017 and C. Macartney and T. Weyde, "Improved speech enhancement with the wave-u-net," arXiv preprint arXiv:1811.11307, 2018 composite objective metrics were computed: SIG: signal distortion, BAK: background intrusiveness and OVL: overall quality as described in Y. Hu and P. C. Loizou, "Evaluation of objective measures for speech enhancement," in *Proc. Interspeech,* 2006. All three measures produce numbers between 1 and 5, with higher meaning better quality. PESQ scores are also reported as a combined measure of quality and STOI as a measure of intelligibility. All test files are downsampled to 16 KHz for measuring objective metrics.

A listening test was also conducted to measure the subjective quality and intelligibility of the systems. For the listening test, 12 of the 24 test files were chosen, with three files from each of the four noise types. The listening test follows the Multiple Stimuli with Hidden Reference and Anchor (MUSHRA) paradigm. Subjects were presented with 9 anonymized and randomized versions of each file to facilitate direct comparison: 5 PR systems (PR-WaveNet, PR-WaveNet-Joint, PR-WaveGlow, PR-WaveGlow-Joint, PR-World), 2 comparison speech enhancement systems (oracle Wiener mask and Chimera++), and clean and noisy signals. The PR-World files are sampled at 16 kHz but the other 8 systems used 22 kHz. Subjects were also provided reference clean and noisy versions of each file. Five subjects took part in the listening test. They were told to rate the speech quality, noise-suppression quality, and overall quality of the speech from 0-100, with 100 being the best.

Subjects were also asked to rate the subjective intelligibility of each utterance on the same 0-100 scale. Specifically, they were asked to rate a model higher if it was easier to understand what was being said. An intelligibility rating was used because asking subjects for transcripts showed that all systems were near ceiling performance. This could also have been a product of presenting different versions of the same underlying speech to the subjects. Intelligibility ratings, while less concrete, do not suffer from these problems.

Table 4 shows the objective metric comparison of the systems. In terms of objective quality, comparing neural vocoders synthesizing from clean speech, WaveGlow scores are higher than WaveNet. WaveNet synthesis has higher SIG quality, but lower BAK and OVL. Comparing the speech enhancement systems, both PR-neural systems outperform Chimera++ in all measures. Compared to the oracle Wiener mask, the PR-neural systems perform slightly worse. After further investigation, the PR resynthesis files were observed to not perfectly aligned with the clean signal itself, which affects the objective scores significantly. Interestingly, with both, PR-(neural)-Joint performance decreases. When listening to the files, the PR-WaveNet-Joint sometimes contains mumbled unintelligible speech and PR-WaveGlow-Joint introduces more distortions.

TABLE 4

Speech enhancement objective metrics: higher is better Systems in the top section decode from clean speech as upper bounds. Systems in the middle section use oracle information about the clean speech. Systems in the bottom section are not given any oracle knowledge. All systems sorted by SIG.

| Model | SIG | BAK | OVL | PESQ | STOI |
|---|---|---|---|---|---|
| Clean | 5.0 | 5.0 | 5.0 | 4.50 | 1.00 |
| WaveGlow | 5.0 | 4.1 | 5.0 | 3.81 | 0.98 |
| WaveNet | 4.9 | 2.8 | 4.0 | 3.05 | 0.94 |
| Oracle Wiener | 4.0 | 2.4 | 3.2 | 2.90 | 0.91 |
| PR-WaveGlow | 3.9 | 2.5 | 3.1 | 2.58 | 0.87 |
| PR-WaveNet | 3.8 | 2.2 | 3.0 | 2.46 | 0.87 |
| Chimera++ | 3.7 | 2.1 | 2.8 | 2.44 | 0.86 |
| PR-WaveGlow-Joint | 3.6 | 2.5 | 2.9 | 2.28 | 0.84 |

TABLE 4-continued

Speech enhancement objective metrics: higher is better Systems in the top section decode from clean speech as upper bounds. Systems in the middle section use oracle information about the clean speech. Systems in the bottom section are not given any oracle knowledge. All systems sorted by SIG.

| Model | SIG | BAK | OVL | PESQ | STOI |
|---|---|---|---|---|---|
| PR-WaveNet-joint | 3.5 | 2.1 | 2.7 | 2.1 | 0.83 |
| PR-World | 2.8 | 2.1 | 2.3 | 1.53 | 0.79 |
| Noisy | 1.9 | 1.9 | 1.7 | 1.58 | 0.74 |

In terms of objective intelligibility, the clean WaveNet model has lower STOI than WaveGlow. For the STOI measurement as well, both speech inputs need to be exactly time-aligned, which the WaveNet model does not necessarily provide. The PR-neural systems have higher objective intelligibility than Chimera++. With PR-WaveGlow, when trained jointly, STOI actually goes down from 0.87 to 0.84. Tuning WaveGlow's $\alpha$ parameter (v in this disclosure) for inference has an effect on quality and intelligibility. When a smaller v is used, the synthesis has more speech drop-outs. When a larger v is used, these drop-outs decrease, but also the BAK score decreases. Without wishing to be bound to any particular theory applicant believes that a lower v, when conditioned on a predicted spectrogram, causes the PR-WaveGlow system to generate segments of speech it is confident in, and mutes the rest.

Figure 4:
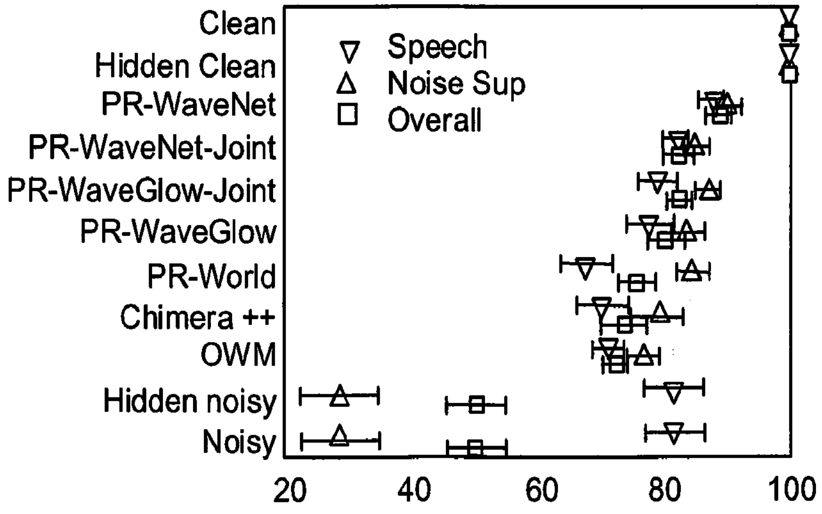
FIG. 4 is a graph showing subject quality assessment with higher scores showing better quality wherein the error bars show twice the standard error.

FIG. 4 shows the result of the quality listening test. PR-WaveNet performs best in all three quality scores, followed by PR-WaveNet-Joint, PR-WaveGlow-Joint, and PR-WaveGlow. Both PR-neural systems have much higher quality than the oracle Wiener mask. The next best model is PR-WORLD followed by Chimera++. PR-WORLD performs comparably to the oracle Wiener mask, but these ratings are lower than found in the Tables presented elsewhere in this disclosure. This is likely due to the use of 22 kHz sampling rates in the current experiment but 16 kHz in the previous experiments.

Figure 5:
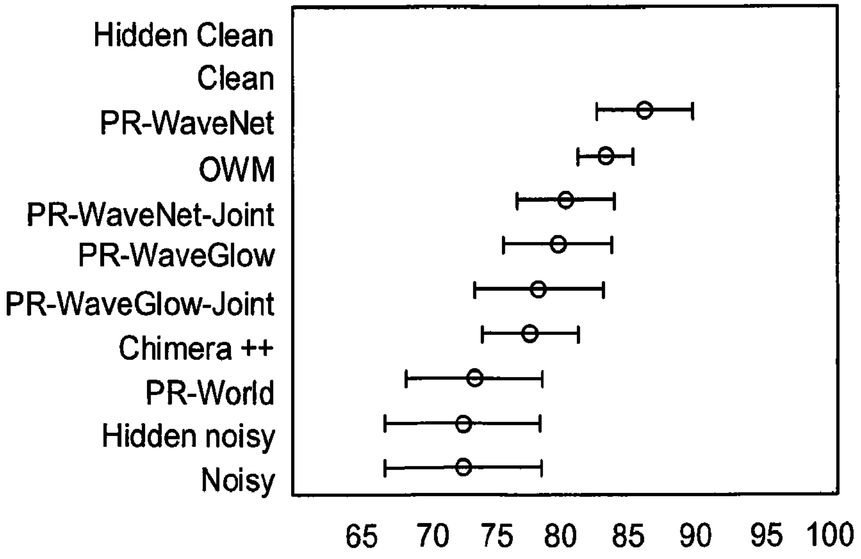
FIG. 5 is a graph showing subjective intelligibility wherein higher scores are more intelligible.

FIG. 5 shows the subjective intelligibility ratings. Noisy and hidden noisy signals have reasonably high subjective intelligibility, as humans are good at understanding speech in noise. The OWM has slightly higher subjective intelligibility than PR-WaveGlow. PR-WaveNet has slightly but not significantly higher intelligibility, and the clean files have the best intelligibility. The PR-(neural)-Joint models have lower intelligibility, caused by the speech drop-outs or mumbled speech as mentioned above.

Table 5 shows the results of further investigation of the drop in performance caused by jointly training the PR-neural systems. The PR-(neural)-Joint models are trained using the vocoder losses. After joint training, both WaveNet and WaveGlow seemed to change the prediction model to make the intermediate clean mel-spectrogram louder. As training continued, this predicted mel-spectrogram did not approach the clean spectrogram, but instead became a very loud version of it, which did not improve performance. When the prediction model was fixed and only the vocoders were fine-tuned jointly, a large drop in performance was observed. In WaveNet this introduced more unintelligible speech, making it smoother but garbled. In WaveGlow this increased speech dropouts (as can be seen in the reduced STOI scores). Finally with the neural vocoder fixed, the prediction model was trained to minimize a combination of mel spectrogram MSE and vocoder loss. This provided slight improvements in performance: both PR-WaveNet and PR-WaveGlow improved intelligibility scores as well as SIG and OVL.

TABLE 5

Objective metrics for different joint fine-tuning schemes for PR-neural systems components

| Model | Fine-tuned | | SIG | BAK | OVL | PESQ | STOI |
|---|---|---|---|---|---|---|---|
| | Pred. | Voc. | | | | | |
| WaveNet | | | 3.8 | 2.2 | 3.0 | 2.46 | 0.87 |
| WaveNet | X | | 3.9 | 2.2 | 3.1 | 2.49 | 0.88 |
| WaveNet | | X | 3.1 | 1.9 | 2.3 | 2.02 | 0.78 |
| WaveNet | X | X | 3.5 | 2.1 | 2.7 | 2.29 | 0.83 |
| WaveGlow | | | 3.9 | 2.5 | 3.1 | 2.58 | 0.87 |
| WaveGlow | X | | 4.0 | 2.5 | 3.2 | 2.70 | 0.90 |
| WaveGlow | | X | 3.6 | 2.5 | 2.9 | 2.24 | 0.82 |
| WaveGlow | X | X | 3.6 | 2.4 | 2.9 | 2.28 | 0.84 |

The following experiments demonstrate that, when trained on data from enough speakers, these vocoders can generate speech from unseen speakers, both male and female, with similar quality as seen speakers in training. Using these two vocoders and a new vocoder LPCNet, the noise reduction quality of PR on unseen speakers was evaluated and show that objective signal and overall quality is higher than the state-of-the-art speech enhancement systems Wave-U-Net, Wavenet-denoise, and SEGAN. Moreover, in subjective quality, multiple-speaker PR out-performs the oracle Wiener mask. These experiments show that, when trained on a large number of speakers, neural vocoders can successfully generalize to unseen speakers. Furthermore, the experiments show PR systems using these neural vocoders can also generalize to unseen speakers in the presence of noise. the speaker dependence of neural vocoders, and their effect on the enhancement quality of PR. For example, when trained on 56 speakers, WaveGlow, WaveNet, and LPCNet are able to generalize to unseen speakers. The noise reduction quality of PR was compared with three state-of-the-art speech enhancement models and show that PR-LPCNet outperforms every other system including an oracle Wiener mask-based system. In terms of objective metrics, the proposed PR-WaveGlow performs better in objective signal and overall quality.

The prediction model is trained with parallel clean and noisy speech. It takes noisy mel-spectrogram Y as input and is trained to predict clean acoustic features X. The predicted clean acoustic features vary based on the vocoder used. WaveGlow, WaveNet LPCNet and WORLD were used as vocoders. For WaveGlow and WaveNet, clean mel-spectrograms were predicted. For LPCNet, 18-dimensional Bark-scale frequency cepstral coefficients (BFCC) and two pitch parameters: period and correlation, were predicted. For WORLD the spectral envelope, aperiodicity, and pitch were predicted. For WORLD and LPCNet, the Δ and ΔΔ of these acoustic features for smoother outputs were predicted. The prediction model is trained to minimize the mean squared error (MSE) of the acoustic features:

$$MSE{:}L=\|X-\hat{X}\|^2 \tag{4}$$

where $\hat{X}$ are the predicted and X are the clean acoustic features. The Adam optimizer is used for training. During test, for a given a noisy mel-spectrogram, clean acoustic parameters are predicted. For LPCNet and WORLD maximum likelihood parameter generation (MLPG) algorithms were used to refine the estimate of the clean acoustic features from predicted acoustic features, Δ, and ΔΔ.

Vocoders: The second part of PR resynthesizes speech from the predicted acoustic parameters $\hat{X}$ using a vocoder. The vocoders are trained on clean speech samples x and clean acoustic features X. During synthesis, predicted acoustic parameters $\hat{X}$ were used to generate predicted clean speech $\hat{X}$. In the rest of this section the vocoders, three neural are described: WaveGlow, WaveNet, LPCNet and one non-neural: WORLD.

WaveGlow learns a sequence of invertible transformations of audio samples x to a Gaussian distribution conditioned on the mel spectrogram X. For inference, WaveGlow samples a latent variable z from the learned Gaussian distribution and applies the inverse transformations conditioned on X to reconstruct the speech sample x. The log likelihood of clean speech is maximized as, $$\ln p(x \mid X) = \ln p(z) + \operatorname{logdet}\left|\frac{dz}{dx}\right| \tag{5}$$

where lnp(z) is the log-likelihood of the spherical zero mean Gaussian with variance $\sigma^2$. During training $\sigma=1$ is used. The officially published WaveGlow implementation was used with the original setup (i.e., 12 coupling layers, each consisting of 8 layers of dilated convolution with 512 residual and 256 skip connections. The PR system with WaveGlow is referred to as its vocoder as PR-WaveGlow.

LPCNet: LPCNet is a variation of WaveRNN that simplifies the vocal tract response using linear prediction $p_t$ from previous time-step samples $$p_t\Sigma_{k=1}^{M}=\alpha_k x_{t-k} \tag{6}$$

LPC coefficients $a_k$ are computed from the 18-band BFCC. It predicts the LPC predictor residual $e_t$, at time t. Then sample $x_t$ is generated by adding $e_t$ and $p_t$.

A frame conditioning feature f is generated from 20 input features: 18-band BFCC and 2 pitch parameters via two convolutional and two fully connected layers. The probability $p(e_t)$ is predicted from $x_{t-1}$, $e_{t-1}$, $p_t$, f via two GRUs (A and B) combined with dualFC layer followed by a softmax. The largest GRU (GRU-A) weight matrix is forced to be sparse for faster synthesis. The model is trained on the categorical cross-entropy loss of $p(e_t)$ and the predicted probability of the excitation $P(e_t)$ Speech samples are 8-bit mu-law quantized. The officially published LPCNet implementation with 640 units in GRU-A and 16 units in GRU-B was used. This PR system with LPCNet as its vocoder is referred to as PR-LPCNet.

WaveNet: WaveNet is a autoregressive speech waveform generation model built with dilated causal convolutional layers. The generation of one speech sample at time step t, $x_t$ is conditioned on all previous time step samples ($x_1$, $x_2$, . . . $x_{t-1}$). The Nvidia implementation was used which is the Deep-Voice model of WaveNet for faster synthesis.

Speech samples are mu-law gauantized to 8 bits. The normalized log mel-spectrogram is used in local conditioning. WaveNet is trained on the cross-entropy between the quantized sample $x_t^{\mu}$ and the predicted quantized sample $\hat{x}_y^{\mu}$.

For WaveNet, a smaller model was used that is able to synthesize speech with moderate quality. The PR model's dependency on speech synthesis quality was tested on a smaller model: 20 layers with 64 residual, 128 skip connections, and 256 gate channels with maximum dilation of 128. This model can synthesize clean speech with average predicted mean opinion score (MOS) 3.25 for a single speaker. The PR system with WaveNet as its vocoder is referred to as PR-WaveNet.

WORLD: Lastly, a non-neural vocoder WORLD was used which synthesizes speech from three acoustic parameters: spectral envelope, aperiodicity, and F0. WORLD was used with the Merlin toolkit. WORLD is a source-filter model that takes previously mentioned parameters and synthesizes speech. Spectral enhancement was used to modify the predicted parameters as is standard in Merlin.

Experiments

Dataset: The publicly available noisy VCTK dataset was used for the experiments. The dataset contains 56 speakers for training: 28 male and 28 female speakers from the US and Scotland. The test set contains two unseen voices, one male and another female. Further, there is another available training set, consisting 14 male and 14 female from England, which was used to test generalization to more speakers.

The noisy training set contains ten types of noise: two are artificially created, and the eight other are chosen from DEMAND. The two artificially created are speech shaped noise and babble noise. The eight from DEMAND are noise from a kitchen, meeting room, car, metro, subway car, cafeteria, restaurant, and subway station. The noisy training files are available at four SNR levels: 15, 10, 5, and 0 dB. The noisy test set contains five other noises from DEMAND: living room, office, public square, open cafeteria, and bus. The test files have higher SNR: 17.5, 12.5, 7.5, and 2.5 dB. All files are down-sampled to 16 KHz for comparison with other systems. There are 23, 075 training audio files and 824 testing audio files.

Experiment 1: Speaker Independence of Neural Vocoders

WaveGlow and WaveNet were tested to see if one can generalize to unseen speakers on clean speech. Using the data described above, both of these models were trained with a large number of speakers (56) and test them on 6 unseen speakers. Their performance was compared to LPCNet which has previously been shown to generalize to unseen speakers. In this test, each neural vocoder synthesizes speech from the original clean acoustic parameters. Synthesis quality was measured with objective enhancement quality metrics consisting of three composite scores: CSIG, CBAK, and COVL. These three measures are on a scale from 1 to 5, with higher being better. CSIG provides and estimate of the signal quality, BAK provides an estimate of the background noise reduction, and OVL provides an estimate of the overall quality.

LPCNet is trained for 120 epochs with a batch size of 48, where each sequence has 15 frames. WaveGlow is trained for 500 epochs with batch size 4 utterances. WaveNet is trained for 200 epochs with batch size 4 utterances. For WaveNet and WaveGlow GPU synthesis was used, while for LPCNet CPU synthesis is used as it is faster. WaveGlow and WaveNet synthesize from clean mel-spectrograms with window length 64 ms and hop size 16 ms. LPCNet acoustic features use a window size of 20 ms and a hop size of 10 ms.

The synthesis quality of three unseen male and three unseen female speakers was performed. These were compared with unseen utterances from one known male speaker. For each speaker, the average quality is calculated over 10 files. Table 6 shows the composite quality results along with the objective intelligibility score from STOI. WaveGlow has the best quality scores in all the measures. The female speaker scores are close to the known speaker while the unseen male speaker scores are a little lower. These values are not as high as single speaker WaveGlow, which can synthesize speech very close to the ground truth. LPCNet scores are lower than those of WaveGlow but better than WaveNet. Between LPCNet and WaveNet, a significant difference in synthesis quality for male and female voices was not observed. Although WaveNet has lower scores, it is consistent across known and unknown speakers. Thus, WaveNet is believed to generalize to unseen speakers.

TABLE 6

Speaker generalization of neutral vocoders. Objective quality metrics for synthesis from true acoustic features, higher is better. Soted by SIG. 95% confidence internals.

| Model | # spk | CSIG | CBAK | COVL | STOI |
|---|---|---|---|---|---|
| Seen | | | | | |
| WaveGlow | 1 | 4.7 ± 0.03 | 3.0 ± 0.02 | 4.0 ± 0.04 | 0.95 ± 0.01 |
| LPCNet | 1 | 3.8 ± 0.06 | 2.2 ± 0.04 | 2.9 ± 0.07 | 0.91 ± 0.01 |
| WaveNet | 1 | 3.3 ± 0.05 | 2.1 ± 0.02 | 2.5 ± 0.04 | 0.81 ± 0.01 |
| Unseen-Male | | | | | |
| WaveGlow | 3 | 4.5 ± 0.07 | 2.8 ± 0.06 | 3.8 ± 0.10 | 0.95 ± 0.01 |
| LPCNet | 3 | 4.0 ± 0.10 | 2.3 ± 0.08 | 3.1 ± 0.12 | 0.93 ± 0.01 |
| WaveNet | 3 | 3.2 ± 0.02 | 2.1 ± 0.02 | 2.5 ± 0.03 | 0.83 ± 0.01 |
| Unseen-Female | | | | | |
| WaveGlow | 3 | 4.6 ± 0.08 | 2.8 ± 0.06 | 3.9 ± 0.05 | 0.95 ± 0.01 |
| LPCNet | 3 | 4.0 ± 0.08 | 2.4 ± 0.07 | 3.1 ± 0.10 | 0.90 ± 0.04 |
| WaveNet | 3 | 3.3 ± 0.03 | 2.0 ± 0.04 | 2.5 ± 0.03 | 0.80 ± 0.01 |

Experiment 2: Speaker Independence of Parametric Resynthesis

The generalizability of the PR system across different SNRs and unseen voices was tested. The test set of 824 files with 4 different SNRs was used. The prediction model is a 3-layer bi-directional LSTM with 800 units that is trained with a learning rate of 0.001. For WORLD filter size is 1024 and hop length is 5 ms. PR models were compared with a mask based oracle, the Oracle Wiener Mask (OWM), that has clean information available during test.

Table 7 reports the objective enhancement quality metrics and STOI. The OWM performs best, PR-WaveGlow performs better than Wave-U-Net and SEGAN on CSIG and COVL. PR-WaveGlow's CBAK score is lower, which is expected since this score is not very high even with synthetic clean speech (as shown in Table 6). Among PR models, PR-WaveGlow scores best and PR-WaveNet performs worst in CSIG. The average synthesis quality of the WaveNet model affects the performance of the PR system poorly. PR-WORLD and PR-LPCNet scores are lower as well. Both of these models sound much better than the objective scores would suggest. Without wishing to be bound to any particular theory, as both of these models predicts F0, even a slight error in F0 prediction is believed to affect the objective scores adversely. For this, the PR-LPCNet using the noisy F0 was tested instead of the prediction, and the quality scores increase. In informal listening the subjective quality with noisy F0 is similar to or worse than the predicted F0 files. Hence the objective enhancement metrics are not a very good measure of quality for PR-LPCNet and PR-WORLD.

TABLE 7

Speech enhancement objective metrics on full 824-file test set: higher is better. Top system uses oracle clean speech information. Bottom section compared to published comparison system results.

| Model | CSIG | CBAK | COVL | STOI |
|---|---|---|---|---|
| Oracle Wiener | 4.3 ± 0.04 | 3.8 ± 0.19 | 3.8 ± 0.22 | 0.98 ± 0.01 |
| PR-WaveGlow | 3.8 ± 0.03 | 2.4 ± 0.08 | 3.1 ± 0.15 | 0.91 ± 0.02 |
| PR-LPCNet, noisy F0 | 3.5 ± 0.02 | 2.1 ± 0.07 | 2.7 ± 0.12 | 0.88 ± 0.03 |
| PR-LPCNet | 3.1 ± 0.02 | 1.8 ± 0.05 | 2.2 ± 0.08 | 0.88 ± 0.03 |
| PR-World | 3.0 ± 0.02 | 1.9 ± 0.06 | 2.2 ± 0.10 | 0.88 ± 0.02 |
| PR-WaveNet | 2.9 ± 0.10 | 2.0 ± 0.04 | 2.2 ± 0.11 | 0.83 ± 0.01 |
| Wave-U-Net | 3.5 | 3.2 | 3.0 | — |
| SAGAN | 3.5 | 2.9 | 2.8 | — |

Figure 6:
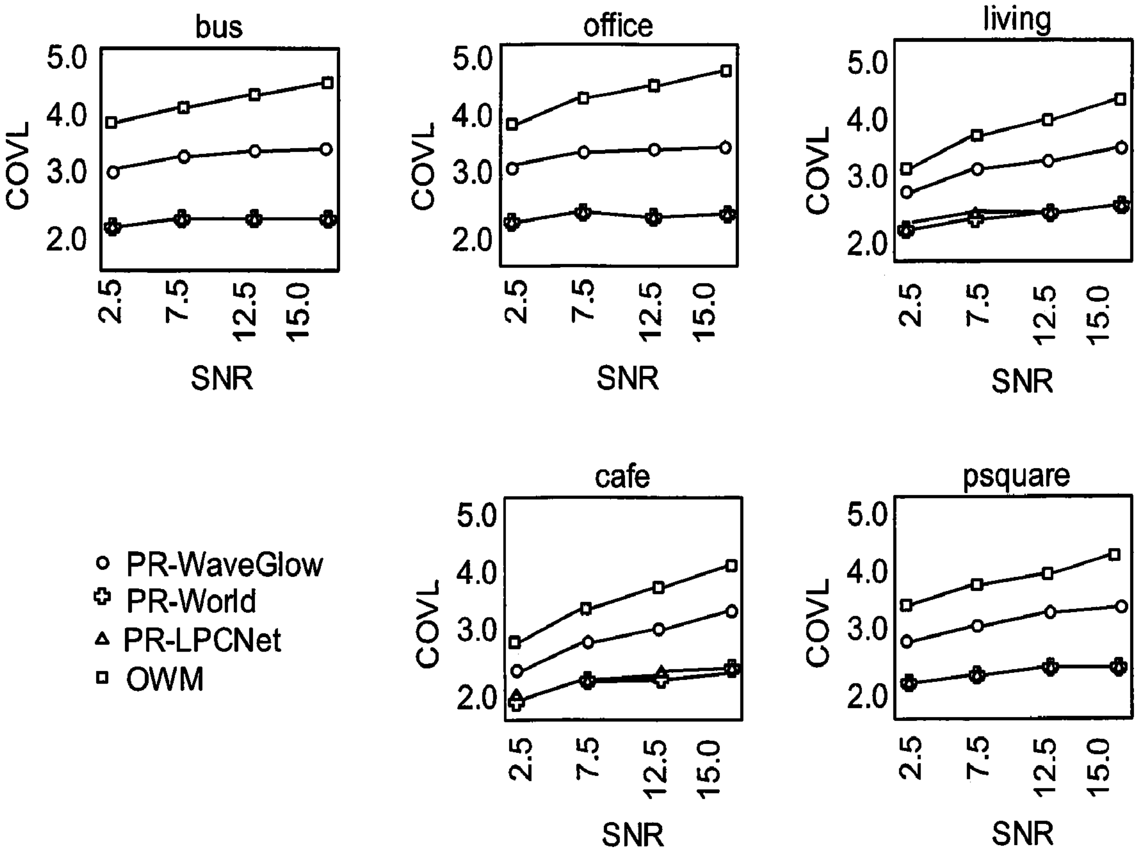
FIG. 6 depict graphs of overall objective quality of the PR system and OWM broken down by noise type (824 test files)

The objective quality of PR models and OWM were tested against different SNR and noise types. The results are shown in FIG. 6. With decreasing SNR, CBAK quality for PR models stays the same, while for OWM, CBAK score decreases rapidly. This shows that the noise has a smaller effect on background quality compared to a mask based system, i.e., the background quality is more related to the presence of synthesis artifacts than recorded background noise.

Listening tests: Next, the subjective quality of the PR systems was subjected to a listening test. For the listening test, 12 of the 824 test files were chosen, with four files from each of the 2.5, 7.5 and 12.5 dB SNRs. The 17.5 dB file had very little noise, and all systems perform well with them. In the listening test, the OWM and three comparison models were compared. For these comparison systems, the publicly available output files were included in the listening tests, selecting five files from each: Wave-U-Net has 3 from 12.5 dB and 2 from 2.5 dB, Wavenet-denoise and SEGAN have 2 common files from 2.5 dB, 2 more files each are selected from 7.5 dB and 1 from 12.5 dB. For Wave-U-Net, there were no 7.5 dB files available publicly.

The listening test follows the Multiple Stimuli with Hidden Reference and Anchor (MUSHRA) paradigm. Subjects were presented with 8-10 anonymized and randomized versions of each file to facilitate direct comparison: 4 PR systems (PR-WaveNet, PR-WaveGlow, PR-LPCNet, PR-World), 4 comparison speech enhancement systems (OWM, Wave-U-Net, WaveNet-denoise, and SEGAN), and clean and noisy signals. Subjects were also provided reference clean and noisy versions of each file. Five subjects took part in the listening test. They were told to rate the speech quality, noise-suppression quality, and overall quality of the speech from 0-100, with 100 being the best. The intelligibility of all of the files was found to be very high, so instead of doing an intelligibility listening test, subjects were asked to rate the subjective intelligibility as a score from 0-100.

Figure 8:
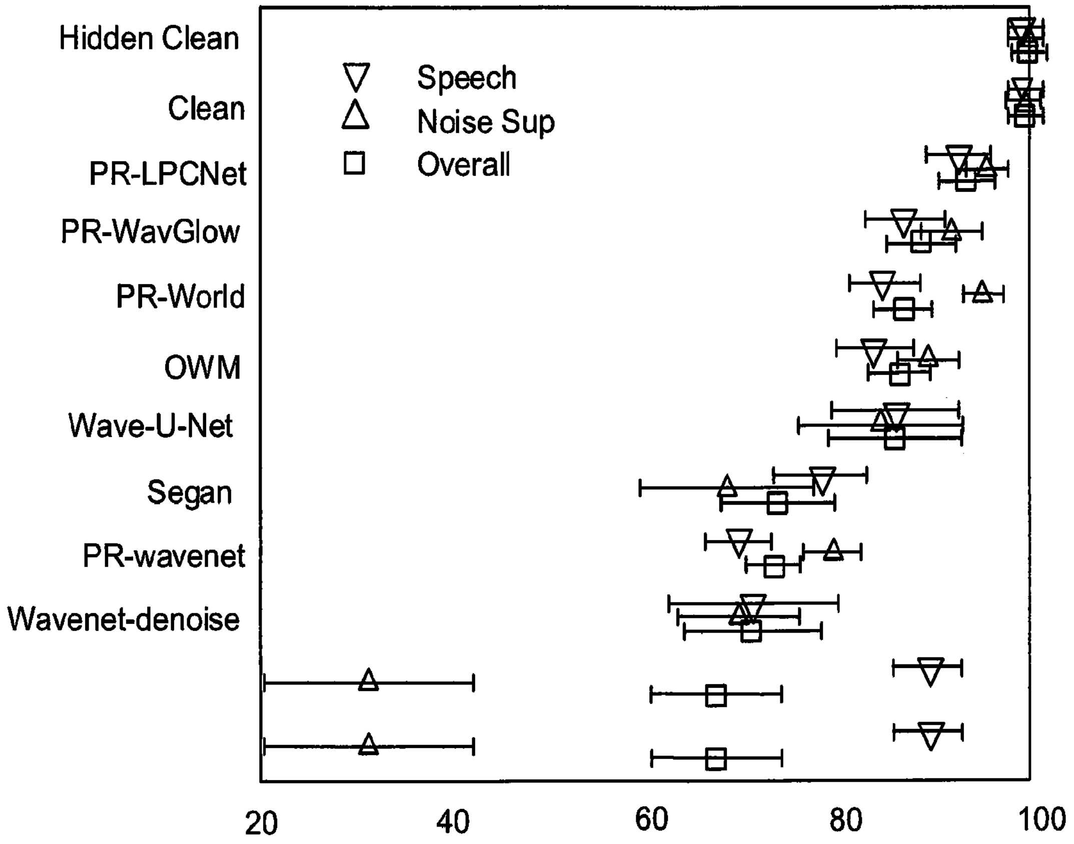
FIG. 8 is a graph showing subjective quality of several systems wherein higher scores are better; error bars show 95% confidence intervals.

FIG. 8 shows the result of the quality listening test. PR-LPCNet performs best in all three quality scores, followed by PR-WaveGlow and PR-World. The next best model is the Oracle Wiener mask followed by Wave-U-Net. Table 8 shows the subjective intelligibility ratings, where PR-LPCNet has the highest subjective intelligibility, followed by OWM, PR-WaveGlow, and PR-World. It also reports the objective quality metrics on the 12 files selected for the listening test for comparison with Table 7 on the full test set. While PR-LPCNet and PR-WORLD have very similar objective metrics (both quality and intelligibility), they have very different subjective metrics, with PR-LPCNet being rated much higher).

TABLE 8

Speech enhancement objective metrics and subjective intelligibility on the 12 listening test files

| Model | CSIG | CBAK | COVL | STOI | Subj. Intel. |
|---|---|---|---|---|---|
| Oracle Wiener | 4.3 ± 0.30 | 3.8 ± 0.30 | 3.9 ± 0.32 | 0.98 ± 0.02 | 0.91 ± 0.02 |
| PR-WaveGlow | 3.8 ± 0.20 | 2.4 ± 0.11 | 3.0 ± 0.19 | 0.91 ± 0.03 | 0.90 ± 0.03 |
| PR-World | 3.10 ± 0.14 | 1.9 ± 0.10 | 2.2 ± 0.15 | 0.88 ± 0.02 | 0.90 ± 0.04 |
| PR-LPCNet | 3.0 ± 0.07 | 1.8 ± 0.05 | 2.2 ± 0.05 | 0.85 ± 0.06 | 0.92 ± 0.03 |
| PR-WaveNet | 2.9 ± 0.09 | 2.0 ± 0.6 | 2.2 ± 0.10 | 0.83 ± 0.03 | 0.74 ± 0.05 |

Tolerance to error: The tolerance of PR models to inaccuracy of the prediction LSTM was measured using the two best performing vocoders, WaveGlow and LPCNet. For this test, 30 random noisy test files were selected. The predicted feature $\hat{X}$ noisy was rendered noisy as, $\hat{X}_e=\hat{X}+\in N$, where $\in=MSE\times e$ %. The random noise N is generated from a Gaussian distribution with the same mean and variance at each frequency as X. Next, the vocoder was synthesized from $\hat{X}_e$. For WaveGlow, X is the mel-spectrogram and for LPCNet, X is 20 features. The LPCNet test was repeated adding noise into all features and only the 18 BFCC features (not adding noise to F0).

Figure 7:
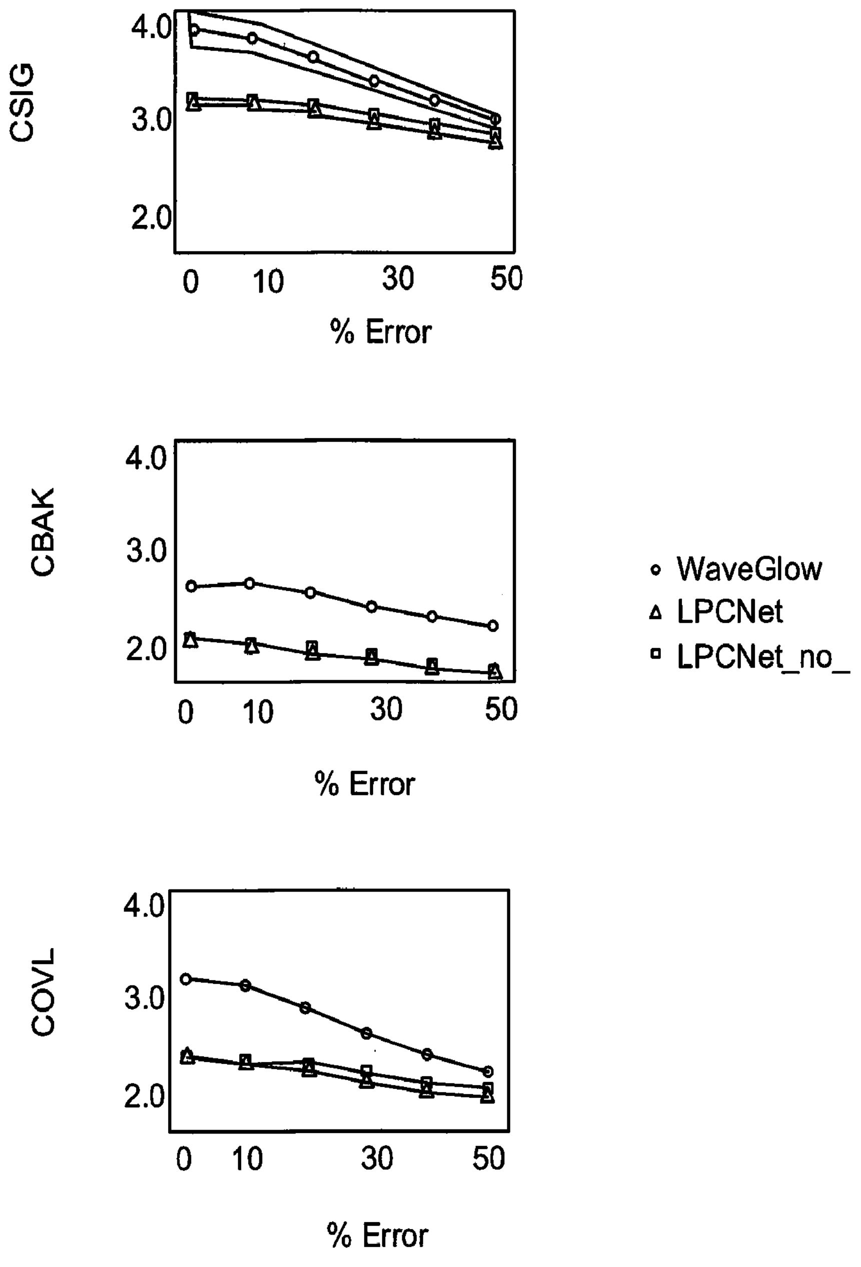
FIG. 7 depict graphs of objective metrics as error that were artificially added to the predictions of the acoustic features wherein higher scores are better; error was measured as a proportion of the standard deviation of the vocoder's acoustic features over time.

FIG. 7 shows the objective metrics for these files. For WaveGlow, e=0-10% does not affect the synthesis quality very much and e>10% decreases performance incrementally. For LPCNet, errors in the BFCC are tolerated better than errors in F0.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for Parametric resynthesis (PR) producing a predicted audible signal from a degraded audio signal produced by distorting a target audio signal, the method comprising:

receiving the degraded audio signal which is derived from the target audio signal;

predicting, with a prediction model, a plurality of parameters of the predicted audible signal from the degraded audio signal including removing noise from the degraded audio signal to output a prediction of a clean acoustic feature including the plurality of parameters;

providing the plurality of parameters to a waveform generator; and synthesizing the predicted audible signal with the waveform generator;

wherein the prediction model has been trained to reduce a loss function between the target audio signal and the predicted audible signal.

2. The method as recited in claim 1, wherein the waveform generator is a vocoder.

3. The method as recited in claim 2, wherein the vocoder is a non-neural vocoder.

4. The method as recited in claim 2, wherein the vocoder is a neural vocoder.

5. The method as recited in claim 4, wherein the neural vocoder is a WaveNet vocoder.

6. The method as recited in claim 4, wherein the neural vocoder is a WaveGlow vocoder.

7. The method as recited in cl aim 4, wherein the neural vocoder is an LPCNet vocoder.

8. The method as recited in claim 1, wherein the plurality of parameters includes at least one of:

(1) a spectral envelope;

(2) a log fundamental frequency (F0); or (3) an aperiodic energy of the spectral envelope.

9. The method as recited in claim 1, wherein the plurality of parameters includes a log mel spectrum of individual frames of audio, creating a log mel spectrogram.

10. The method of claim 9, where the loss function is a mean square error between the target audio signal and the predicted audible signal in the log mel spectrogram.

11. The method of claim 1, where the loss function is a mean square error between the plurality of parameters of the predicted audible signal and corresponding parameters of the target audio signal.

12. The method of claim 1, where the loss function is a mean square error between target audio signal and the predicted audible signal in a time domain.

13. The method of claim 1, where the degraded audio signal is produced by (1) filtering the target audio signal to produce a filtered signal, adding noise to the filtered signal to produce a summed signal, and then non-linearly processing a sum of the filtered signal and the summed signal.

14. The method of claim 1, where the loss function is a negative conditional log-likelihood of clean speech under a probabilistic vocoder given the plurality of parameters.

15. The method of claim 1, where the loss function is a categorical cross-entropy loss of a predicted probability of an excitation of a linear prediction model.

* * * * *